United States Patent Office 2,813,842
Patented Nov. 19, 1957

2,813,842
POLYVINYL CHLORIDE PLASTICIZED WITH A CYANO-DICARBOXYLIC ACID ESTER

Joachim Dazzi, Dayton, Ohio, assignor to Monsanto Chemical Company, St. Louis, Mo., a corporation of Delaware No Drawing. Application October 20, 1955, Serial No. 541,838

3 Claims. (Cl. 260—31.8)

The present invention relates to a new class of organic compounds and deals more particularly with aliphatic cyano polycarboxylic compounds, to methods of producing the same, and to vinyl chloride polymers plasticized with the new compounds.

According to the invention there are provided adducts of non-conjugated, unsaturated, non-hydroxylated aliphatic nitriles of from 7 to 26 carbon atoms and aliphatic, dicarboxylic $\alpha,\beta$-ethylenic acids of not more than 6 carbon atoms or anhydrides or esters thereof having the following general formula:

$$\underset{M_n}{Z-CN}$$ 

in which Z is a non-conjugated, unsaturated, aliphatic hydrocarbon residue of from 6 to 25 carbon atoms, M is

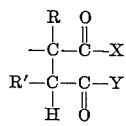

$$\begin{array}{c} R \quad O \\ -\overset{|}{\underset{|}{C}}-\overset{\|}{C}-X \\ R'-\overset{|}{\underset{|}{C}}-\overset{\|}{C}-Y \\ H \quad O \end{array}$$

in which R and R' are members of the group consisting of hydrogen, halogen and the methyl radical, X and Y are members of the group consisting of OH, O-alkyl, O-alkoxyalkyl, O-aryl, O-aralkyl, O-cycloalkyl and O-heterocyclic or together stand for —O— and $n$ is an integer of from 1 to 3.

Non-conjugated, non-hydroxylated aliphatic nitriles generally useful for the preparation of the present cyano polycarboxylates may be designated by the general formula

ZCN in which Z is a non-conjugated, unsaturated aliphatic hydrocarbon residue of from 6 to 25 carbon atoms. As illustrative of nitriles having this formula may be mentioned 5 - hexenonitrile, 2 - nonenonitrile, undecylenonitrile, oleonitrile, elaidonitrile, linoleonitrile, linolenonitrile, eruconitrile, hexacosenonitrile, etc. A number of the nitriles are commercially available materials or are readily prepared derivatives of the by-product higher fatty acids provided by various meat and vegetable processing industries. The nitrile constituent employed for the preparation of the present adducts may also be a technical mixture of higher olefinic nitriles of from 7 to 26 carbon atoms obtained from technical mixtures of fatty acids.

Dicarboxylic, $\alpha,\beta$-ethylenic aliphatic compounds of not more than 6 carbon atoms and suitable for the preparation of the present adducts may be represented by the general formula

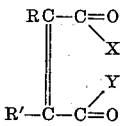

$$\begin{array}{c} RC-C=O \\ \| \quad \diagdown X \\ \| \quad \diagup Y \\ R'-C-C=O \end{array}$$

in which R and R' are members of the class consisting of hydrogen, halogen and the methyl radical and X and Y are members of the group consisting of OH, O-alkyl, O-alkoxyalkyl, O-aryl, O-aralkyl, O-cycloalkyl and O-heterocyclic or together stand for —O—.

One class of $\alpha,\beta$-ethylenic dicarboxylic compounds having the above general formula includes maleic anhydride, and its halogen and methyl derivatives and may be represented by the formula

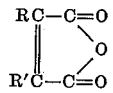

$$\begin{array}{c} RC-C=O \\ \| \quad \diagdown O \\ R'C-C=O \end{array}$$

in which R and R' are selected from the class consisting of hydrogen, methyl and chlorine. As illustrative of compounds having this general formula may be mentioned maleic anhydride, chloromaleic anhydride, dibromomaleic anhydride, citraconic anhydride, etc.

Another class of $\alpha,\beta$-ethylenic dicarboxylic compounds useful for the present purpose comprises maleic and fumaric acids and their halogen and methyl derivatives and esters of the same. This class may be represented by the general formula

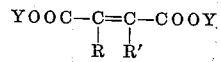

$$\text{YOOC}-\underset{R}{\overset{|}{C}}=\underset{R'}{\overset{|}{C}}-\text{COOY}$$

in which Y is a member of the class consisting of hydrogen and alkyl, alkoxyalkyl, cycloalkyl, aryl, aralkyl and heterocyclic radicals and R and R' are selected from the class consisting of hydrogen, halogen and the methyl radical. As illustrative of compounds having this formula may be mentioned maleic acid, chloromaleic acid, fumaric acid, bromofumaric acid, difluoromaleic acid, itaconic acid, mono-methyl maleate, di-n-octyl maleate, diethyl fumarate, bis(ethoxyethyl)fumarate, diphenyl chloromaleate, dixenyl maleate, di-$\beta$-naphthyl itaconate, dicyclohexyl maleate, di-tetrahydrofurfuryl maleate, dibenzyl itaconate, di-dodecyl fumarate, etc.

Depending upon the reaction conditions and the nature of the individual reactants, there occurs addition of from 1 to 3 moles of the dicarboxylic compounds to the nitrile. For example, undecylonitrile and maleic anhydride may be reacted to give the 1:1 addition product

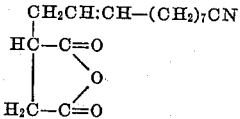

$$\begin{array}{c} \text{CH}_2\text{CH:CH}-(\text{CH}_2)_7\text{CN} \\ | \\ \text{HC}-\text{C}=\text{O} \\ | \quad \diagdown \text{O} \\ \text{H}_2\text{C}-\text{C}=\text{O} \end{array}$$

The reaction of the same nitrile with diethyl fumarate may take place to yield not only the 1:1 addition product, but also adducts in which 2 and even 3 moles of diethyl fumarate have added to the nitrile. In the formation of the higher undecylenonitrile-diethyl fumarate adducts, addition occurs not only at the ethylenic double bond of the fumarate but also at one or more intermediate points on the carbon chain of the undecylonitrile to give a 1:3 nitrile-dicarboxylate adduct having the possible structure

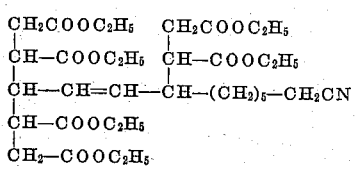

$$\begin{array}{c} \text{CH}_2\text{COOC}_2\text{H}_5 \quad \text{CH}_2\text{COOC}_2\text{H}_5 \\ | \quad \quad \quad \quad \quad | \\ \text{CH}-\text{COOC}_2\text{H}_5 \quad \text{CH}-\text{COOC}_2\text{H}_5 \\ | \quad \quad \quad \quad \quad | \\ \text{CH}-\text{CH}=\text{CH}-\text{CH}-(\text{CH}_2)_5-\text{CH}_2\text{CN} \\ | \\ \text{CH}-\text{COOC}_2\text{H}_5 \\ | \\ \text{CH}_2-\text{COOC}_2\text{H}_5 \end{array}$$

and a 1:2 nitrile-fumarate addition product having the probable structure

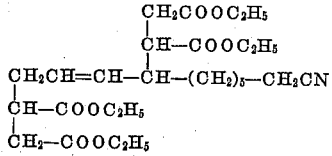

$$\begin{array}{c} \text{CH}_2\text{COOC}_2\text{H}_5 \\ | \\ \text{CH}-\text{COOC}_2\text{H}_5 \\ | \\ \text{CH}_2\text{CH}=\text{CH}-\text{CH}-(\text{CH}_2)_5-\text{CH}_2\text{CN} \\ | \\ \text{CH}-\text{COOC}_2\text{H}_5 \\ | \\ \text{CH}_2-\text{COOC}_2\text{H}_5 \end{array}$$

The present invention provides cyano dicarboxylic adducts by reaction of one mole of the nitrile with one mole of the dicarboxylic compound, cyano tetracarboxylic compounds by reaction of one mole of the nitrile with 2 moles of the dicarboxylic compound, and cyano hexacarboxylic compounds by reaction of one mole of the nitrile with 3 moles of the dicarboxylic compound. Because of uncertainty concerning the position at which the dicarboxylic residue is attached to the fatty acid nitrile, the present adducts will be hereinafter referred to without stipulating the position of the introduced carboxy groups. For convenience, however, when dealing with adducts prepared from maleic acid, maleic acid esters, fumaric acid or fumaric acid esters, the introduced carboxy groups will be designated as 1', 2'-dicarboxyethyl groups and the products obtained with a higher fatty acid nitrile, e. g., oleonitrile will be referred to as (1',2'-dicarboxyethyl)oleonitrile or esters of the same in case of the 1:1 addition products, as bis(1',2'-dicarboxyethyl)oleonitrile or esters thereof in the case of the 1:2 addition products and as tris(1'-2'-dicarboxyethyl)oleonitrile or esters thereof in the case of the 1:3 addition products.

Adducts containing two or more ester groups are obtainable by a variety of procedures. They may be prepared by esterifying, in the usual manner, adducts obtained by reaction of non-conjugated, non-hydroxylated, unsaturated aliphatic nitriles of from 7 to 26 carbon atoms and dicarboxylic, α,β-ethylenic, aliphatic acids of not more than 6 carbon atoms or the anhydrides thereof. For example, the 1:1 maleic anhydride-oleonitrile adduct (1',2'-dicarboxyethyl)oleonitrile, may be reacted with a hydroxy compound, e. g., an alkanol, such as ethanol, butoxyethanol, butanol, hexanol, or dodecanol; a phenol, such as o-cresol, β-naphthol, or p-phenylphenol; a cyclohexanol or a heterocyclic hydroxy compound, such as tetrahydrofurfuryl alcohol to yield the esterified adducts. The cyano esters may also be prepared directly, i. e., by the addition reaction of the unsaturated nitrile with an ester of the α,β-ethylenic, aliphatic acid, e. g., by reaction of a nitrile like undecylenonitrile with a maleate, such as dimethyl or diphenyl maleate; a fumarate, such as difurfuryl fumarate or di-dodecyl fumarate; a chloromaleate, such as di-β-naphthyl or dicyclohexyl chloromaleate; an itaconate, such as di-n-butyl or bis(2-ethylhexyl)itaconate, etc.

Addition of the above α,β-ethylenic dicarboxylic compounds to the non-conjugated, non-hydroxylated, unsaturated aliphatic nitriles of from 7 to 26 carbon atoms occurs readily upon heating a mixture of the two components at a temperature of, say, at least 150° C. until the formation of the desired cyano polycarboxylic compound. The formation of 1:1, 1:2 or 1:3 adducts is a function of reaction proportions, of heating time and temperature. Employing equimolar quantities of the reactants or an excess of the nitrile the product is generally a 1:1 adduct. An excess of the dicarboxylic compound and short heating, say, for from a few minutes to two or three hours at temperatures of from, say, 150° C. to 180° C., generally results in the formation of a preponderance of the 1:1 adduct. With longer heating time, say, a heating time of from 10 to 48 hours, a preponderance of the higher ratio adducts are formed at these same temperatures. The higher ratio adducts are also formed in preponderant quantities when employing a shorter heating time, but higher temperatures, i. e., temperatures of from, say, 190° C. to 250° C. depending upon the reactivities and decomposition points of the reactants. The use of superatmospheric pressure, and in some instances of pressures below atmospheric, will materially influence the choice of temperature and heating period.

The addition reaction generally takes place in the absence of catalysts, diluents or other extraneous materials. If desired, however, there may be added to the initial reaction mixture a small quantity, say, from 0.05 percent to 0.1 percent, based on the weight of the total of the two reactants, of an organic phosphorus compound, which has been found to have a stabilizing effect on the reaction. Thus, products of greater clarity and lighter color are usually obtained when operating in the presence of an ester of a phosphorus acid or in the presence of the color stabilizing compounds disclosed in my copending applications, Serial No. 144,393, filed February 15, 1950, now Patent No. 2,661,359, Serial No. 151,997, filed March 25, 1950, now Patent No. 2,598,634, and Serial No. 155,341, filed April 11, 1950, now Patent No. 2,598,635, assigned to the same assignee as is the present invention.

In some instances, particularly when employing solid or non-miscible reactants, the use of an inert, high-boiling diluent is advantageous.

The present cyano di- and polycarboxylic compounds are stable, high-boiling materials which range from viscous liquids to solid products. They may be advantageously employed for a variety of technical uses, i. e., as carboxy compounds in the preparation of polyester or polyamide resinous materials, and as intermediates in the production of moisture-proofing agents, biological toxicants, lubricant additives, etc. Adducts containing two or more carboxylate radicals are generally valuable as plasticizers for synthetic resins and plastics.

Advantageously employed as plasticizers, particularly for vinyl chloride polymers, i. e., polyvinyl chloride and copolymers of vinyl chloride with unsaturated monomers, are esters having the general structure $$\begin{matrix} Z CN \\ | \\ M_n \end{matrix}$$

in which Z is a non-conjugated, unsaturated aliphatic hydrocarbon residue of from 6 to 25 carbon atoms, M is $$\begin{matrix} R \\ | \\ -C-COOY \\ | \\ HC-COOY \\ | \\ R' \end{matrix}$$

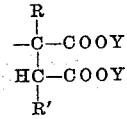

in which R and R' are members of the group consisting of hydrogen, halogen and the methyl radical, Y is a member of the group consisting of alkyl, alkoxyalkyl, cycloalkyl, aryl, aralkyl and heterocyclic radicals and n is an integer of from 1 to 3. A class of cyano carboxylates included in the general formula shown above and possessing especially beneficial properties when employed with vinyl chloride polymers are compounds which are represented by the formula $$\begin{matrix} Z CN \\ | \\ M_n \end{matrix}$$

in which Z is a non-conjugated, unsaturated aliphatic hydrocarbon residue of from 6 to 25 carbon atoms and M is $$\begin{matrix} -HC-COOAlk \\ | \\ H_2C-COOAlk \end{matrix}$$

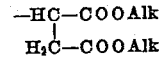

wherein Alk denotes an alkyl radical of from 1 to 18 carbon atoms.

The present cyano di- or polycarboxylates not only soften vinyl chloride polymers, but also impart a high degree of low temperature flexibility, very good temperature stability and great mechanical strength to these polymers. They are compatible with vinyl chloride polymers and show no exudation of plasticizer even at plasticizer content of up to 50 percent. Although the quantity of plasticizer will depend upon the particular polymer to be plasticized and upon its molecular weight, it is generally found that compositions having from 5 percent to 50 percent by weight of plasticizer will, in most cases, be satisfactory for general utility. The good flexibility of the plasticized compositions increases with increasing plasticizer concentration.

In evaluating the plasticizer efficiency use is made of the following empirical testing procedures:

*Compatability.*—Visual inspection of the plasticized composition is employed, incompatability of the plasticizer with the polymer being demonstrated by cloudiness and exudation of the plasticizer.

*Hardness.*—A standard instrument made by the Shore Instrument Company is used for this determination and expresses the hardness in units from one to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature the flexibility of these compositions at low temperatures may vary considerably, i. e., plasticized polyvinyl chloride compositions that are flexible at room temperature often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the Low Temperature Flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatilization the plasticized composition become stiff and hard. The test for plasticizer volatility herein employed is that described by the American Society for Testing Materials under the designation D-744–44T.

*Water resistance.*—The amount of water absorption and the amount of leaching that takes place when the plasticized composition is immersed in distilled water for 24 hours is determined.

The invention is further illustrated, but not limited, by the following examples:

Example 1

This example shows the preparation of a 1:1 oleonitrile-maleic anhydride adduct and esterification of the latter with ethanol. A mixture consisting of 237 grams (0.9 mole) of distilled oleonitrile (Armour and Company, Chicago, Illinois), 110.0 grams (1.125 moles) of maleic anhydride, and 2.0 grams of triphenyl phosphite (as color stabilizer) was heated to a temperature of 200° C. for a period of six hours. At the end of this time the reaction product was treated with 7.5 grams of clay and 3.0 grams of a filter aid, stirred for 30 minutes and filtered. The solid residue was washed with water and the washings combined with the filtrate and allowed to stand for separation of the resulting organic layer. After repeated water washings of the organic layer, the latter was submitted to distillation to remove material boiling up to 212° C./1–2 mm. The residue (257.3 grams) was the substantially pure 1:1 oleonitrile-maleic anhydride adduct, analyzing 3.34 percent nitrogen as against 3.88 percent, the calculated nitrogen for the 1:1 adduct.

108 grams of this adduct was mixed with a large excess of ethanol (about 800 ml.) and about 15 grams of sulfuric acid (96 percent) and the mixture was refluxed for a time of 5 hours. During the reaction a mixture of water and ethanol was distilled off. At the end of 5 hours, the reaction product was allowed to cool and it was then fractionated to give the substantially pure diethyl (1',2'-dicarboxyethyl)oleonitrile, B. P. 200 to 230° C./0.2 mm.; $n_D^{25}$ 1.4608.

Example 2

This example shows the preparation of adducts of various ratios from undecylenonitrile and diethyl fumarate.

A mixture consisting of 49.5 grams (0.3 mole) of 10-undecylenonitrile and 129.0 grams (0.75 mole) of diethyl fumarate was heated under reflux for a time of 30 hours. During this period the temperature rose from 212° C. to 225° C. during the first 6 hours, from 225° C. to 260° C. during the next 13.5 hours, and then remained at 235° C. during the last 10.5 hours. Distillation of the resulting product under reduced pressure gave the following fractions:

I. B. P. 176 to 190° C./0.4 mm., 3.1 grams $n_D^{25}$ 1.4591, having a saponification equivalent of 199. This is probably a mixture of adducts.

II. B. P. 191 to 230° C./0.4 to 0.6 mm., 39.5 grams $n_D^{25}$ 1.4628, having a saponification equivalent of 121.7, 126.6. Since the calculated saponification equivalent of a 1:2 undecylenonitrile-diethyl fumarate adduct is 127.4, this fraction is predominantly the 1:2 adduct.

III. B. P. 231 to 270° C./0.6 to 2.5 mm., 40.1 grams, $n_D^{25}$ 1.4685, having a saponification equivalent of 110.2, 111.0. Since the calculated saponification equivalent of a 1:3 undecylenonitrile-diethyl fumarate adduct is 113.3, this fraction is predominantly the 1:3 adduct.

Example 3

A mixture consisting of 158 grams (0.6 mole) of oleonitrile and 232.5 grams (1.35 moles) of diethyl fumarate was refluxed during a 48 hour period. During this time the boiling point of the mixture rose from 215° C. to 252° C. Off-gases, equal to 9.18 milliequivalents of sodium hydroxide, were collected in diluted aqueous caustic solution. Fractionation of the resulting product under reduced pressure gave the following fractions.

I. B. P. 121 to 180° C./0.3 to 0.4 mm., 25.6 grams. Probably unreacted material.

II. B. P. 181 to 200° C/0.3 to 0.4 mm., 29.9 grams, having a saponification equivalent of 191.6. Since the calculated saponification equivalent of a 1:1 oleonitrile-diethyl fumarate adduct is 217.6, this is probably a mixture of adducts.

III. B. P. 201 to 230° C./0.3 to 0.5 mm., 64.5 grams, having a saponification equivalent of 160. Since the calculated saponification equivalent of a 1:2 oleonitrile-diethyl fumarate adduct is 151.9, this fraction is primarily a 1:2 adduct.

IV. B. P. 231 to 265° C./0.5 to 1.0 mm., 103.7 grams, having a saponification equivalent of 156.5 as against 151.9, the calculated value for a 1:2 oleonitrile-diethyl fumarate adduct. This fraction is predominantly a 1:2 adduct.

V. Liquid residue, 124.5 grams, having a saponification equivalent of 130.8. Since the calculated saponification equivalent of a 1:3 oleonitrile-diethyl fumarate adduct is 130.0, this fraction is the substantially pure 1:3 adduct.

Example 4

Sixty parts of polyvinyl chloride and 40 parts by weight of the diethyl (1',2'-dicarboxyethyl)oleonitrile of Example 1 are mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 37° C., which value denotes extremely good low temperature properties. Tests on the volatility characteristics of the plasticized composition gave a value of 1.4 percent which showed very good retention of plasticizer and indicated good temperature characteristics of the composition. The plasticized material had a hardness of 70 before the volatility test and a hardness of 70 after the volatility test. When subjected to heat at a temperature of 325° F. for a period of 30 minutes the clarity and color of the molded product were substantially unchanged. Tests of the water-resistance properties of the plasticized material employing the test procedure described above showed a solids-loss of only 0.08 percent and an 0.50 percent water absorption value.

Instead of the ester employed in the example above there may be employed as plasticizers for polyvinyl chloride and for copolymers of vinyl chloride and unsaturated monomers copolymerizable therewith, other cyano esters having the general structure

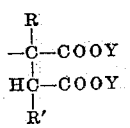

in which Z is a non-conjugated, unsaturated aliphatic hydrocarbon residue of from 6 to 25 carbon atoms, M is $$\begin{array}{c} R \\ | \\ -C-COOY \\ | \\ HC-COOY \\ | \\ R' \end{array}$$

in which R and R' are members of the class consisting of hydrogen, halogen and the methyl radical, Y is a member of the group consisting of alkyl, alkoxyalkyl, cycloalkyl, aryl, aralkyl and heterocyclic radicals and $n$ is an integer of from 1 to 3. Thus, instead of diethyl (1',2'-dicarboxyethyl)oleonitrile there may be employed the diethyl ester of (1',2'-dicarboxyethyl)undecylenonitrile or the diisoamyl, didodecyl, bis(2-ethylhexyl), dioctadecyl, diphenyl, dibenzyl, di-β-naphthyl, dixenyl or difurfuryl esters of (1',2'-dicarboxyethyl)undecylenonitrile or of (1',2'-dicarboxyethyl)oleonitrile. Also, instead of using the cyano diesters, the cyano tetra-esters or the cyano hexa-esters may be employed, i. e., esters prepared by reacting unsaturated, non-conjugated, aliphatic nitriles of from 7 to 26 carbon atoms with esters of α,β-aliphatic ethylenic dicarboxylic acids of not more than 6 carbon atoms under conditions permitting the formation of 1:2 and 1:3 nitrile-dicarboxylate adducts, e. g., the addition products of undecylenonitrile with 2 or 3 moles of dicarboxylates such as dibenzyl, di-n-butyl, bis(tetrahydrofurfuryl), bis-(2-ethylhexyl), di-p-tolyl, dicyclopentyl or dimethyl maleate, chloromaleate, fumarate or itaconate.

While the above example shows only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 percent to 20 percent is preferred. The present cyano esters are compatible with polyvinyl chloride over wide ranges of concentrations, up to 50 percent of esters based on the total weight of the plasticized composition yielding desirable products.

Although the invention has been described particularly with reference to the use of the present cyano esters as plasticizers for polyvinyl chloride, these esters are advantageously employed also as plasticizers for copolymers of vinyl chloride, for example, the copolymers of vinyl chloride with vinyl acetate, or vinylidene chloride, etc. Preferably, such copolymers have a high vinyl chloride content, i. e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present esters are substantially unreactive with the commercially available heat and light stabilizers which are commonly employed with polyvinyl chloride or copolymers thereof, the presence of such materials in the plasticized materials does not impair the valuable properties of the present esters. The present esters are of general utility in softening vinyl chloride polymers. They may be used as the only plasticizing component in a compounded vinyl chloride polymer or they may be used in conjunction with other plasticizers.

This is a continuation-in-part of my copending application Serial No. 170,050, filed June 23, 1950, now Patent No. 2,745,844.

What I claim is:

1. A resinous composition comprising polyvinyl chloride plasticized with an ester having the formula:

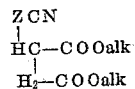

in which Z is a non-conjugated, unsaturated aliphatic hydrocarbon residue of from 6 to 25 carbon atoms and alk denotes an alkyl radical of from 1 to 18 carbon atoms, said ester being from 5 to 50 percent of the weight of the composition.

2. A resinous composition comprising polyvinyl chloride plasticized with from 5 to 50 percent by weight of said composition of a dialkyl (1',2'-dicarboxyethyl) oleonitrile having from 1 to 18 carbon atoms in the alkyl radical.

3. A resinous composition comprising polyvinyl chloride plasticized with from 5 to 50 percent by weight of said composition of diethyl (1',2'-dicarboxyethyl) oleonitrile.

References Cited in the file of this patent

UNITED STATES PATENTS

| 2,456,517 | Ladd et al. | Dec. 14, 1948 |
| 2,516,307 | Floyd | July 25, 1950 |